(12) United States Patent
Ishioka et al.

(10) Patent No.: US 6,867,157 B2
(45) Date of Patent: Mar. 15, 2005

(54) OPTICAL GLASS HAVING AN ANOMALOUS DISPERSION

(75) Inventors: Junko Ishioka, Sagamihara (JP); Masahiro Onozawa, Sagamihara (JP)

(73) Assignee: Kabushiki Kaisha Ohara, Kanagawa-ken (JP)

( * ) Notice: Subject to any disclaimer, the term of this patent is extended or adjusted under 35 U.S.C. 154(b) by 172 days.

(21) Appl. No.: 10/408,686

(22) Filed: Apr. 7, 2003

(65) Prior Publication Data

US 2003/0199383 A1 Oct. 23, 2003

(30) Foreign Application Priority Data

Apr. 18, 2002 (JP) .................................... 2002-116869

(51) Int. Cl.$^7$ ............................................. C03C 3/118
(52) U.S. Cl. ........................... 501/59; 501/63; 501/66; 501/69; 501/70; 501/903
(58) Field of Search ............... 501/59, 63, 66, 501/68, 69, 70, 72, 903

(56) References Cited

U.S. PATENT DOCUMENTS

| 4,055,435 | A | * | 10/1977 | Sagara | ........................ 501/63 |
| 4,084,978 | A | * | 4/1978 | Sagara | ........................ 501/63 |
| 4,719,186 | A | * | 1/1988 | Mennemann et al. | ......... 501/67 |
| 2003/0040424 | A1 | * | 2/2003 | Wolff et al. | ................... 501/68 |

FOREIGN PATENT DOCUMENTS

| DE | 973 350 | 1/1960 |
| DE | 32 06 227 | 9/1983 |
| DE | 197 38 428 | 8/1998 |
| FR | 2 313 328 | 12/1976 |
| GB | 2 115 403 | 9/1983 |

OTHER PUBLICATIONS

Patent Abstract of Japan vol. 1997 No. 03 Mar. 31, 1997 & JP 08 290936.

* cited by examiner

Primary Examiner—David Sample
(74) Attorney, Agent, or Firm—Hedman & Costigan, P.C.

(57) ABSTRACT

An optical glass having a positive anomalous dispersion comprises, in mass %,

| $SiO_2$ | 40–60% |
| $B_2O_3$ | 3–9% |
| $TiO_2$ | 3–15% |
| $Nb_2O_5$ | 0.1–5.0% |
| $Al_2O_3$ | 3–15% |
| $WO_3$ | 0.5–5.0% |
| MgO | 0–3% |
| CaO | 0–3% |
| SrO | 0–3% |
| BaO | 0–3% |
| $K_2O$ | exceeding 10% and up to 21% |
| $Na_2O$ | 0–10% |
| $Sb_2O_3$ | 0–1% |
| and a fluoride or fluorides of a metal element or elements contained in the above metal oxides, a total amount of F contained in the fluoride or fluorides | 3–10%, | is free of PbO and $As_2O_3$ except for unavoidable mixing of these compounds as impurities, has optical constants of a refractive index (nd) within the range from 1.48 to less than 1.55 and an Abbe number (vd) within the range from 45 to 55, and has an anomalous dispersion ($\Delta\theta g,F$) of +0.0010 or over.

10 Claims, No Drawings

OPTICAL GLASS HAVING AN ANOMALOUS DISPERSION

BACKGROUND OF THE INVENTION

This invention relates to an optical glass having optical constants of a refractive index (nd) within the range from 1.48 to less than 1.55 and an Abbe number (vd) within the range from 45 to 55, having a positive anomalous dispersion of Δθg,F of +0.0010 or over and being particularly suitable for reheat pressing.

A lens system of an optical instrument is normally designed by combining lenses having different optical properties. A lens consisting of glass having a positive or negative anomalous dispersion is used for correcting secondary spectrum and a glass of a low refractive index having a positive anomalous dispersion is technically important because it can extend freedom of design for lens systems of optical instruments the type of which is of an increasing variation, though the quantity of production of this type of glass is not so large at present.

For producing an optical element such as a lens from an optical glass, which is not manufactured in a large scale, a general method is as follow which economically suited for a small scale production of many types of products.

Process 1: At room temperature, cutting or splitting or grinding an optical glass which has been formed to a plate or block to a glass gob of a predetermined weight.

Process 2: Reheating the glass gob (obtained by process 1) to soften and pressing the softened glass gob to a shape resembling the shape of a desired optical element Process 3 Grinding and polishing the press mold product (obtained by process 2) to the shape of desired optical element and applying coating on its polished surface.

Temperature of glass which corresponds to viscosity of the glass suitable for the reheat pressing is a temperature range which is higher than the glass transition temperature (Tg) by 200° C. to 300° C. The reheat pressing is conducted by placing glass gob having a temperature which is held within the above described temperature range in a press mold which is held at a temperature lower than the temperature of the glass for preventing fusing together of the glass and the press mold, and press molding the glass. For reducing deterioration of the press mold caused by contact of the glass of a high temperature with the press mold during reheat pressing, a lower glass temperature is preferable. For this purpose, it is preferable to conduct the reheat pressing at a temperature within a temperature range which is higher than the glass transition temperature (Tg) by 200° C. to 250° C. If devitrification or opaqueness caused by phase separation does not take place when the glass has been held for 30 minutes at a temperature within a temperature range which is higher than the glass transition temperature (Tg) by 200° C. to 300° C., the glass can be subjected to the reheat pressing. If devitrification or opaqueness caused by phase separation does not take place when the glass has been held for 30 minutes in a temperature range which is higher than the glass transition temperature (Tg) by 200° C. to 250° C., the reheat pressing is available for that glass with reduced deterioration of the press mold.

In a case of a glass which tends to cause devitrification or opaqueness, when the glass is reheated and held for 30 minutes at a temperature within the temperature range which is higher than the glass transition temperature (Tg) by 200° C. to 300° C., devitrification or opaqueness caused by phase separation takes place. If the glass which tends to cause devitrification or opaqueness is not held at a temperature within the above described temperature range but the temperature at which the glass is held is further raised, occurrence of devitrification or opaqueness is decreased but, when the glass is subjected to the reheat pressing while it is held at a temperature of Tg+250° C. or over, the press mold tends to deteriorate for the reason stated above with resulting reduction in the life of the press mold and, therefore, such reheat pressing is not desirable. When the glass is subjected to the reheat pressing while it is held at a temperature of Tg+300° C., viscosity of the glass is reduced with resulting difficulty in reheat pressing.

Among ingredients of an optical glass, PbO and $As_2O_3$ have recently been considered as materials causing adverse influence to the environment. Since waste and sludge of these ingredients which are produced in manufacturing and processing of the glass pollute the environment, special care must be taken for protecting the environment when such waste and sludge are treated as industrial waste. In Europe, it is scheduled to prohibit use of an optical glass containing PbO in future. For these reasons, there is an increasing demand for an optical glass which does not contain these ingredients. Since, however, PbO has a great influence on optical and chemical properties of an optical glass, it is fairly difficult to develop an optical glass which does not contain PbO and yet has optical and chemical properties which are substantially equivalent to those of the prior art optical glass containing PbO.

Glasses of various compositions having optical constants of a refractive index (nd) within the range from 1.48 to less than 1.55 and an Abbe number (vd) within the range from 45 to 55 are disclosed by German Patent No. 973350 which has very broad composition ranges in its scope of claim. Among these glasses of various compositions, there is a $SiO_2$—$B_2O_3$—$Al_2O_3$—$K_2O$—PbO—$As_2O_3$—$TiO_2$—F system glass. Since, however, this glass contains PbO and $As_2O_3$, it has the disadvantages that it has the problem of environmental pollution and that opaqueness caused by phase separation takes place when the glass is reheated and held at a temperature within the temperature range which is higher than the glass transition temperature (Tg) by 200° C. to 250° C.

The German patent also discloses glasses which has the above described optical constants and is free of PbO but these glasses mostly contain $As_2O_3$ in an amount of 0.3–5.0 weight % which causes the environmental pollution and, further, has at least one of the following disadvantages (1) to (5):

(1) When the glass is reheated and is held at a temperature within a temperature range which is higher than the glass transition temperature by 200° C. to 250° C., opaqueness caused by phase separation tends to take place. (2) Chemical durability of the glass is poor. (3) Light transmittance on the short wavelength side in the visible region is poor. (4) Since the melting property of the glass is poor and melting of the glass at a high temperature is required, fluorine in the glass evaporates with the result that a homogeneous optical glass having desired optical properties cannot be obtained. (5) Since the glass contains a relatively large amount of $Sb_2O_3$ ingredient (3.0–15.0 weight %), Sb metal and/or Sb ion tends to alloy with platinum constituting the melting equipment.

Further, the German patent also discloses optical glasses which have the above described optical constants and is free of PbO and $As_2O_3$ but these optical glasses all contain a very large amount of $Sb_2O_3$ (20.0–30.0 weight %) and, therefore, these glasses have a stronger tendency to the above described alloying. For continuously producing a high quality optical glass, most optical glasses presently are manufactured by using a melting equipment which is made of platinum at least in a portion which comes into contact with melted glass. If the Sb metal and/or Sb ion alloys with platinum, heat resisting property of the alloyed portion is substantially deteriorated and, as a result, there occurs a danger that a hole is formed in the alloyed portion to let the melted glass flow out of the melting equipment. In that event, the melting operation must be stopped instantly and the glass under melting must be scrapped and, moreover, the melting equipment must be disjointed and the portion where the hole has been formed must be repaired. This repair work stops glass production for a long period of time. Furthermore, since platinum is an expensive material, the alloyed platinum must be refined again and reused. Thus, there occur substantial danger and economic loss caused by the alloying accident.

Japanese Patent Application Laid-open Publication No. 6-92675 discloses specific compositions of an optical glass having optical constants of a refractive index (nd) within a range from 1.48 to less than 1.55 and an Abbe number (vd) within a range from 45 to 55, being free of PbO and $As_2O_3$ and containing fluorine. This optical glass however is not free from at least one of the above described disadvantages (1) and (2).

Japanese Patent Application Laid-open Publication No. 8-290936 discloses specific compositions of an optical glass having optical constants of a refractive index (nd) within a range from 1.48 to less than 1.55 and an Abbe number (vd) within a range from 45 to 55 and being free of PbO and $AS_2O_3$. This optical glass however, has no positive anomalous dispersion. Moreover, this optical glass has the problem that the glass tends to be colored.

It is, therefore, an object of the present invention to provide an optical glass which has eliminated the above described disadvantages of the prior art optical glasses comprehensively, namely an optical glass having a positive anomalous dispersion which is free of PbO and $As_2O_3$ which cause environmental pollution, has optical constants of a refractive index (nd) within a range from 1.48 to less than 1.55 and an Abbe number (vd) within a range from 45 to 55, is free of opaqueness when the glass is reheated and held at a temperature within a temperature range which is higher than the glass transition temperature by 200° C. to 300° C., particularly by 200° C. to 250° C., and can be produced safely without being alloyed with platinum in the melting process.

SUMMARY OF THE INVENTION

Laborious studies and experiments made by the inventors of the present invention for achieving the above described object of the invention have resulted in the finding, which has led to the present invention, that an optical glass which can achieve the above described object can be provided in a $SiO_2$—$B_2O_3$—$TiO_2$—$Nb_2O_5$—$Al_2O_3$—$WO_3$—$K_2O$—F system glass which has not been disclosed in the past.

For achieving the above described object of the invention, there is provided an optical glass having a positive anomalous dispersion, comprising, in mass %,

| | |
|---|---|
| $SiO_2$ | 40–60% |
| $B_2O_3$ | 3–9% |
| $TiO_2$ | 3–15% |
| $Nb_2O_5$ | 0.1–5.0% |
| $Al_2O_3$ | 3–15% |
| $WO_3$ | 0.5–5.0% |
| MgO | 0–3% |
| CaO | 0–3% |
| SrO | 0–3% |
| BaO | 0–3% |
| $K_2O$ | exceeding 10% and up to 21% |
| $Na_2O$ | 0–10% |
| $Sb_2O_3$ | 0–1% |
| and a fluoride or fluorides of a metal element or elements contained in the above metal oxides, a total amount of F contained in the fluoride or fluorides | 3–10%, | being free of PbO and $As_2O_3$ except for unavoidable mixing of these compounds as impurities, having optical constants of a refractive index (nd) within the range from 1.48 to less than 1.55 and an Abbe number (vd) within the range from 45 to 55, and having an anomalous dispersion ($\Delta\theta g,F$) of +0.0010 or over.

The value of $\Delta\theta g,F$ which represents a positive anomalous dispersion was calculated by the following method:

Partial dispersion ratio ($\theta g,F$) was calculated by the Formula 1 described below. In a $\theta g,F$–vd diagram wherein the vertical axis reresents the partial dispersion ratio ($\theta g,F$) and the horizontal axis represents the Abbe number (vd), two normal optical glasses NSL7 and PBM2 (manufactured by Ohara) having the partial dispersion ratio ($\theta g,F$) and the Abbe number (vd) shown in the following Table 1 were selected as reference from among normal optical glasses having no anomalous dispersion, and difference in the vertical axis ($\Delta\theta g,F$) between the line connecting the co-ordinates ($\theta g,F$, vd) of the two reference optical glasses and co-ordinates ($\theta g,F$, vd) of a glass to be compared was expressed as deviation in the partial dispersion ratio, i.e., the anomalous dispersion. In a case where the value of $\Delta\theta g,F$ calculated in this manner is a positive value, i.e., when the co-ordinates ($\theta g,F$, vd) of the glass to be compared is located above the line connecting the two reference glasses, the glass has a positive anomalous dispersion.

$$\theta g,F=(ng-nF)/(nF-nc) \quad \text{Formula (1)}$$

(where ng represents refractive index of the glass at the spectral line of a wavelength of 435.835 nm from mercury, nF represents refractive index of the glass at the spectral line of a wavelength of 486.13 nm from hydrogen and nc represents refractive index of the glass at the spectral line of a wavelength of 656.27 nm from hydrogen, and (nF−nc) is called the main dispersion.)

TABLE 1

| Product name | $\theta g, F$ | vd |
|---|---|---|
| NSL7 | 0.5436 | 60.49 |
| PBM2 | 0.5828 | 36.26 |

For achieving the object of the present invention, there is also provided an optical glass having a positive anomalous dispersion, comprising, in mass %,

| | |
|---|---|
| $SiO_2$ | 40–60% |
| $B_2O_3$ | 3–9% |
| $TiO_2 + WO_3$ | 4–20% |
| in which $TiO_2$ | 3–15% |
| and $WO_3$ | 0.5–5.0% |
| $Nb_2O_5$ | 0.1–5.0% |
| $Al_2O_3$ | 3–15% |
| MgO | 0–3% |
| CaO | 0–3% |
| SrO | 0–3% |
| BaO | 0–3% |
| $K_2O + Na_2O$ | less than 25% |
| in which $K_2O$ | exceeding 10% and up to 21% |
| and $Na_2O$ | 0–10% |
| $Sb_2O_3$ | 0–1% |
| and a fluoride or fluorides of a metal element or elements contained in the above metal oxides, a total amount of F contained in the fluoride or fluorides | 3–10%, | being free of PbO and $As_2O_3$ except for unavoidable mixing of these compounds as impurities, having optical constants of a refractive index (nd) within the range from 1.48 to less than 1.55 and an Abbe number (vd) within the range from 45 to 55, and having an anomalous dispersion (Δθg,F) of +0.0010 or over.

The value of Δθg,F was calculated by the above described method.

In one aspect of the invention, in the optical glass having a positive anomalous dispersion described above, opaqueness and devitrification do not take place in the glass when the glass has been reheated and held for 30 minutes at a temperature within a temperature range which is higher than glass transition temperature (Tg) by 200° C. to 300° C.

According to this aspect of the invention, since opaqueness and devitrification do not take place in the glass when the glass has been reheated and held for 30 minutes at a temperature within a temperature range which is higher than glass transition temperature (Tg) by 200° C. to 300° C. and this temperature range corresponds to viscosity of the glass suitable for the reheat pressing, a press mold product can be manufactured by the reheat pressing which is suited to a small scale production of many types of products.

In another aspect of the invention, in the optical glass having a positive anomalous dispersion described above, opaqueness and devitrification do not take place in the glass when the glass has been reheated and held for 30 minutes at a temperature within a temperature range which is higher than glass transition temperature (Tg) by 200° C. to 250° C.

According to this aspect of the invention, since opaqueness and devitrification do not take place in the glass when the glass has been reheated and held for 30 minutes at a temperature within a temperature range which is higher than glass transition temperature (Tg) by 200° C. to 250° C. and this temperature range is one which causes little damage to the press mold and therefore is suitable for the reheat pressing, deterioration of the press mold used for the reheat pressing can be reduced.

In another aspect of the invention, in the optical glass having a positive anomalous dispersion described above, water resistance of the glass is Class 1 as measured by the Method of Measuring Chemical Durability of Optical Glass (Powder Method) as defined by the Japan Optical Glass Industry Association Standard JOGIS06-[1999].

According to this aspect of the invention, since water resistance of the glass is excellent, there does not occur dimming in the polished surface of the glass which tends to occur particularly during the process for grinding and polishing the press mold product and before applying coating on the polished surface.

In another aspect of the invention, in the optical glass having a positive anomalous dispersion described above, wavelength of light ray which a glass piece having thickness of 10±0.1 mm transmits with spectral transmittance of 80% including reflection loss is 390 nm or below.

According to this aspect of the invention, light transmittance on the short wavelength side in the visible region is excellent, reduction in transmitting light which is undesirable when the glass is used for an optical element such as a lens can be avoided.

DETAILED DESCRIPTION OF THE INVENTION

In the glass made according to the invention, the above described content ranges of the respective ingredients have been selected for the reasons stated below. In the following description, the content range of the respective ingredients are expressed in mass %.

The $SiO_2$ ingredient is an indispensable ingredient as a glass forming oxide. If the amount of this ingredient is less than 40%, it becomes difficult to obtain a stable glass and chemical durability is insufficient whereas if the amount of this ingredient exceeds 60%, it becomes difficult to obtain a glass having the optical constants which are to be achieved by the invention and, besides, melting property of the glass deteriorates.

The $B_2O_3$ ingredient is effective for improving the melting property of the glass and resistance to devitrification and therefore is an indispensable ingredient in the invention. If the amount of this ingredient is less than 3%, these effects cannot be achieved satisfactorily whereas if the amount of this ingredient exceeds 9%, there is strong tendency to occurrence of opaqueness when the glass is reheated and held at a temperature within a temperature range which is higher than the glass transition temperature (Tg) by 200° C. to 250° C. and, besides, chemical durability and light transmittance of the glass deteriorate.

The $TiO_2$ ingredient increases the refractive index and also increases dispersion (i.e., decreasing the Abbe number) and is effective for adjusting the optical constants to the above described ranges which are the object of the invention. Further, it has been found that, by coexistence with the $WO_3$ ingredient to be described later, this ingredient has the effect of preventing occurrence of opaqueness in the glass when the glass is reheated and held at a temperature within a temperature range which is higher than the glass transition temperature (Tg) by 200° C. to 250° C. If the amount of this ingredient is less than 3%, these effects cannot be achieved satisfactorily whereas if the amount of this ingredient exceeds 15%, the target optical constants cannot be obtained and light transmittance deteriorates significantly.

The $Nb_2O_5$ ingredient is effective for maintaining the optical constants within the target ranges and also for improving the melting property and resistance to devitrification and, therefore, is an essential ingredient in the present invention. If the amount of this ingredient is less than 0.1%, these effects cannot be achieved satisfactorily whereas if the amount of this ingredient exceeds 5.0% the target optical constants of the invention cannot be achieved.

The $Al_2O_3$ ingredient is effective for improving chemical durability of the glass. If the amount of this ingredient is less than 3%, this effect cannot be achieved satisfactorily whereas if the amount of this ingredient exceeds 15%, devitrification tendency of the glass increases.

The $WO_3$ ingredient is an important ingredient in the present invention in that it has the same effect as that of the $Nb_2O_5$ ingredient and, besides, it has been found that, by coexistence with the $TiO_2$ ingredient, this ingredient has the effect of preventing occurrence of opaqueness in the glass when the glass is reheated and held at a temperature within a temperature range which is higher than the glass transition temperature (Tg) by 200° C. to 250° C. If the amount of this ingredient is less than 0.5%, these effects cannot be achieved satisfactorily whereas if the amount of this ingredient exceeds 5.0%, the stability of the glass tends to decrease and devitrification tendency of the glass increases.

If the total amount of the $WO_3$ ingredient and the $TiO_2$ ingredient is 4% or over, the effect of preventing opaqueness in the glass becomes significant. It is, therefore, preferable to add these ingredients in the total amount within the range from 4% to 20%.

The MgO, CaO, SrO, BaO and $Na_2O$ ingredients may be optionally added according to necessity for the purpose of adjusting the optical constants and improving the melting property. If the amounts of these ingredients exceed 3%, 3%, 3%, 3% and 10% respectively, chemical durability of the glass deteriorates.

The $K_2O$ ingredient is an essential ingredient for improving the melting property of the glass and achieving the target optical constants of the invention. If the amount of this ingredient is 10% or less, the melting property deteriorates whereas if the amount of this ingredient exceeds 21%, chemical durability of the glass deteriorates significantly.

For obtaining an optical glass which has a particularly excellent chemical durability, the total amount of the $Na_2O$ and $K_2O$ ingredients should preferably be less than 25%.

The $Sb_2O_3$ ingredient may be optionally added because it has an effect of homogenizing the glass. For achieving this effect, the amount of addition of this ingredient up to 1% will suffice.

Addition of a fluoride or fluorides such as $KHF_2$, KF, $AlF_3$, NaF, $CaF_2$, $BaF_2$ and $BaSiF_6$ which is a fluoride or fluorides which is replaced a part or all of said metal oxide or oxides has an effect of imparting a positive anomalous dispersion to the glass and, for this reason, this is an essential ingredient in the present invention. Fluorine further is effective for decreasing the refractive index and thereby adjusting the optical constants of the invention and, besides, improving the melting property of the glass. If the total amount of fluorine (F) contained in the fluoride or fluorides which is replaced a part or all of said metal oxide or oxides is less than 3%, these effects cannot be achieved satisfactorily whereas if the total amount of F exceeds 10%, there occurs cord in the glass with resulting deterioration in the quality of the glass.

EXAMPLES

Tables 2 to 5 show compositions of Examples No. 1 to 8 of the optical glass of th present invention having a positive anomalous dispersion and Comparative Examples A to F of the prior art optical glasses together with refractive index (nd), Abbe number (vd), θg,F, Δθg,F, wavelength ($T_{80}$) of light ray which a glass piece having thickness of 10±0.1 mm transmits with spectral transmittance of 80% including reflection loss, glass transition temperature (Tg), water resistance (Class) and result of the reheat test. Since the glass of Comparative Example D became brown as a whole, those properties of this glass are not shown.

In Tables 2 and 3, values of the line of $K_2O$ represent amounts (mass %) of $K_2O$ substituted by a fluoride and values of the line of F represent amounts (mass %) of F in the fluoride which substituted $K_2O$.

The values of θg,F and Δθg,F were obtained by measuring ng, nF and nc of the glass and calculating these values in the above described manner.

$T_{80}$ represents wavelength of light ray which a glass piece having thickness of 10±0.1 mm transmits with spectral transmittance of 80% including reflection loss, the glass piece having been polished in both surfaces in accordance with the Method of Measuring Coloration of Optical Glass as defined by the Japan Optical Glass Industry Association Standard JOGIS02-[1999]. The smaller the value of $T_{80}$, the better the light transmittance on the short wavelength side in the visible region.

Water resistance (Class) was measured by the Method of Measuring Chemical Durability of Optical Glass (Powder Method) as defined by the Japan Optical Glass Industry Association JOGIS06-[1999], namely the obtained glass was crashed to granularity of 425 nm to 600 μm, the crashed glass having a mass corresponding to the specific gravity of the glass was placed in a platinous basket which in turn was immersed in a round bottom flask of fused quartz containing pure water and was treated in a boiling water bath for 60 minutes and the ratio (%) of reduction of weight of the glass specimen after the treatment was calculated. Water resistance in the case where the ratio of reduction was less than 0.05% was rated Class 1, one in the case where the ratio of reduction was within the range from 0.05% to less 0.10% was ranked Class 2 and one in the case where the ratio of reduction was within the range from 0.10% to less than 0.25% was ranked Class 3. The smaller the number of the class, the better the water resistance.

The reheat test was made by placing a glass specimen in the shape of a square rod having width and thickness of 15 mm and length of 30 mm each on a support made of a refractory material, reheating the glass specimen in an electric furnace by raising the temperature from room temperature to a temperature which is higher than the glass transition temperature (Tg) by 250° C. in 150 minutes, holding the glass specimen for 30 minutes at that temperature, taking the glass specimen out of the electric furnace, and observing, by the eye, the glass specimen which was polished on opposite surfaces for enabling the inside of the glass specimen to be observed by the eye. Results of the reheat test are shown by expressing a glass specimen which was transparent and colorless without occurrence of opaqueness and devitrification by ○ and a glass specimen in which opaqueness or devitrification was observed by X.

TABLE 2

| | in mass % Examples | | | | |
|---|---|---|---|---|---|
| | 1 | 2 | 3 | 4 | 5 |
| $SiO_2$ | 48.8 | 42.4 | 50.3 | 52.1 | 52.5 |
| $B_2O_3$ | 7.1 | 8.1 | 7.0 | 8.0 | 7.4 |
| $TiO_2$ | 5.1 | 14.6 | 6.6 | 8.6 | 9.5 |
| $Nb_2O_5$ | 0.2 | 1.0 | 0.6 | 0.5 | 2.0 |
| $Al_2O_3$ | 10.1 | 5.0 | 7.9 | 7.6 | 4.6 |
| $WO_3$ | 0.5 | 2.2 | 1.4 | 1.1 | 3.0 |
| $Na_2O$ | 5.1 | 5.0 | | | |
| $KHF_2$ | 11.4 | 7.2 | 17.3 | 13.6 | 13.6 |
| (F) | (5.5) | (3.5) | (8.4) | (6.6) | (6.6) |
| ($K_2O$) | (6.9) | (4.4) | (10.4) | (8.2) | (8.2) |
| $K_2O$ | 11.3 | 13.7 | 8.5 | 8.0 | 7.2 |
| $Sb_2O_3$ | 0.4 | 0.8 | 0.4 | 0.5 | 0.2 |
| nd | 1.497 | 1.547 | 1.511 | 1.532 | 1.501 |

TABLE 2-continued

| | in mass % Examples | | | | |
|---|---|---|---|---|---|
| | 1 | 2 | 3 | 4 | 5 |
| νd | 54.0 | 47.2 | 51.0 | 45.8 | 54.9 |
| θg, F | 0.5561 | 0.5679 | 0.5648 | 0.5751 | 0.5557 |
| Δθg, F | 0.0020 | 0.0028 | 0.0058 | 0.0077 | 0.0030 |
| $T_{80}$ (nm) | 370 | 380 | 370 | 380 | 370 |
| Tg (° C.) | 480 | 420 | 440 | 470 | 460 |
| Water resistance (Class) | 1 | 1 | 1 | 1 | 1 |
| Reheat test result | ○ | ○ | ○ | ○ | ○ |

TABLE 3

| | in mass % Examples | | |
|---|---|---|---|
| | 6 | 7 | 8 |
| $SiO_2$ | 53.3 | 42.0 | 56.6 |
| $B_2O_3$ | 7.9 | 8.1 | 5.0 |
| $TiO_2$ | 4.5 | 5.6 | 5.5 |
| $Nb_2O_5$ | 0.5 | 3.1 | 4.0 |
| $Al_2O_3$ | 3.0 | 12.7 | 3.0 |
| $WO_3$ | 1.5 | 4.6 | 3.5 |
| BaO | | 3.1 | |
| CaO | 2.4 | | |
| MgO | | | 3.0 |
| $Na_2O$ | 3.5 | | |
| $KHF_2$ | 6.2 | 20.5 | 8.3 |
| (F) | (3.0) | (9.9) | (4.1) |
| ($K_2O$) | (3.7) | (12.4) | (5.0) |
| $K_2O$ | 16.2 | | 10.6 |
| $Sb_2O_3$ | 1.0 | 0.3 | 0.5 |
| nd | 1.524 | 1.483 | 1.540 |
| νd | 52.3 | 54.2 | 48.0 |
| θg, F | 0.5587 | 0.5586 | 0.5659 |
| Δθg, F | 0.0018 | 0.0048 | 0.0021 |
| $T_{80}$ (nm) | 370 | 380 | 360 |
| Tg (° C.) | 450 | 430 | 480 |
| Water resistance (Class) | 1 | 1 | 1 |
| Reheat test result | ○ | ○ | ○ |

TABLE 4

| | in mass % Comparative Examples | | |
|---|---|---|---|
| | A | B | C |
| $SiO_2$ | 54.1 | 58.0 | 45.0 |
| $B_2O_3$ | 7.9 | 1.0 | |
| $TiO_2$ | 7.8 | 5.0 | 5.0 |
| $Nb_2O_5$ | | | 1.0 |
| $Al_2O_3$ | 8.5 | 1.0 | 12.0 |
| $Na_2O$ | | 20.0 | 30.0 |
| $K_2O$ | 20.0 | 2.0 | |
| $Cs_2O$ | | 8.0 | |
| F | O→F (4.0) | | (4.8) |
| $AlF_3$ | | | 7.0 |
| $Sb_2O_3$ | | 0.2 (:*) | |
| PbO | 1.2 | | |
| $As_2O_3$ | 0.5 | | |
| $P_2O_5$ | | | 3.0 |
| $Bi_2O_3$ | | | 2.0 |
| nd | 1.51281 | 1.5305 | 1.5214 |
| νd | 50.5 | 50.3 | 51.8 |
| θg, F | 0.5653 | 0.5585 | 0.5596 |
| Δθg, F | 0.0055 | 0.0008 | 0.0019 |
| $T_{80}$ (nm) | 390 | 360 | 360 |

TABLE 4-continued

| | in mass % Comparative Examples | | |
|---|---|---|---|
| | A | B | C |
| Tg (° C.) | 440 | 480 | 450 |
| Water resistance (Class) | 1 | 2 | 3 |
| Reheating test result | X (opaqueness) | ○ | X (opaqueness) |

(:*) percentage ratio against the total amount of the other ingredients

TABLE 5

| | in mass % Comparative Examples | | |
|---|---|---|---|
| | D | E | F |
| $SiO_2$ | 45.0 | 49.5 | 49.2 |
| $B_2O_3$ | | 10.0 | 8.0 |
| $TiO_2$ | | 10.0 | 10.0 |
| $Al_2O_3$ | 2.0 | 10.0 | 9.0 |
| $Na_2O$ | 20.0 | | |
| $K_2O$ | 7.5 | 20.0 | 23.0 |
| F | | O→F (4.0) | O→F (3.0) |
| ZnO | 3.0 | | |
| $As_2O_3$ | | 0.5 | 0.5 |
| $SnO_2$ | 0.5 (*) | | |
| $P_2O_5$ | 10.0 | | |
| $Bi_2O_3$ | 12.5 | | |
| nd | | 1.5214 | 1.5269 |
| νd | | 45.5 | 48.1 |
| θg, F | | 0.5759 | 0.5682 |
| Δθg, F | | −0.0080 | 0.0045 |
| $T_{80}$ (nm) | | 400 | 370 |
| Tg (° C.) | | 460 | 450 |
| Water resistance (Class) | | 2 | 3 |
| Reheating test result | | X (opaqueness) | ○ |

(*) percentage ratio against the total amount of the other ingredients

As shown in Tables 4 and 5, the glass of Comparative Example A became opaque as a result of the reheat test and, therefore, it is not suitable for the reheat pressing. The glass of Comparative Example B has no positive anomalous dispersion and water resistance is Class 2 showing that the glass is inferior in chemical durability. The glass of Comparative Example C became opaque as a result of the reheat test and, therefore, is not suitable for the reheat pressing and, besides, its water resistance is Class 3 showing that the glass is inferior in chemical durability. The glass of Comparative Example D became brown as a whole as described above and cannot be used for an optical glass which requires to be transparent and colorless. The glass of Comparative Example E became opaque as a result of the reheat test and, therefore, is not suitable for the reheat pressing and, besides, its water resistance is Class 2 showing that the glass is inferior in chemical durability and its $T_{80}$ is 400 nm showing that light transmittance in the short wavelength side in the visible region is not satisfactory. The glass of Comparative Example F has water resistance of Class 3 showing that the glass is inferior in chemical durability.

In contrast, as shown in Tables 2 and 3, the glasses of Examples No. 1 to No. 8 having a positive anomalous dispersion according to the present invention all have optical constants of a refractive index (nd) within the range from 1.48 to less than 1.55 and an Abbe number (νd) within the range from 45 to 55 and have Δθg,F of +0.0010 or over, exhibiting a positive anomalous dispersion. Further, the glasses of these examples have $T_{80}$ of 390 nm or below showing that the glasses have excellent light transmittance in the short wavelength side of the visible ray wavelength region, have water resistance of Class 1 showing that these glasses have excellent chemical durability, and are transparent and colorless without occurrence of opaqueness and devitrification as a result of the reheat test and, therefore, are suitable for the reheat pressing. In sum, the glasses of these examples of the present invention are superior in at least one of the light transmittance, chemical durability and result of the reheat test to the glasses of Comparative Examples A to F.

For manufacturing the glasses of the examples of Tables 2 and 3, conventional raw materials for an optical glass such as oxides, carbonates, nitrates, fluorides and hydroxides were weighed and mixed at a predetermined ratio to constitute the compositions shown in the tables. These raw materials were put in a platinum crucible, melted at a temperature within a range from 1300° C. to 1500° C. for about three to four hours depending upon difference in the melting property imparted by the composition, and were stirred and homogenized. The melt was cast into a mold after its temperature was lowered and then was annealed. Thus, these optical glasses were obtained easily.

As described in the foregoing, the optical glass having a positive anomalous dispersion of the present invention is a $SiO_2$—$B_2O_3$—$TiO_2$—$Nb_2O_5$—$Al_2O_3$—$WO_3$—$K_2O$—F system and has a $\Delta\theta g,F$ value of +0.0010 or over, which value represents the positive anomalous dispersion, and therefore is useful for correcting secondary spectrum by using it as, e.g., a lens of an optical system such as an optical instrument. Further, since the glass has excellent resistance to opaqueness and devitrification caused by glass reheating, it is suitable for the reheat pressing. Further, the glass has excellent chemical durability and light transmittance required for a high quality optical glass and, moreover, it can be manufactured safely because it does not alloy with platinum during the melting process. Furthermore, the glass is advantageous in that it does not contain PbO or $As_2O_3$ which causes the environmental pollution. Thus, the optical glass of the present invention has a great industrial utility.

What is claimed is:

1. An optical glass having a positive anomalous dispersion comprising, in mass %,

| | |
|---|---|
| $SiO_2$ | 40–60% |
| $B_2O_3$ | 3–9% |
| $TiO_2$ | 3–15% |
| $Nb_2O_5$ | 0.1–5.0% |
| $Al_2O_3$ | 3–15% |
| $WO_3$ | 0.5–5.0% |
| MgO | 0–3% |
| CaO | 0–3% |
| SrO | 0–3% |
| BaO | 0–3% |
| $K_2O$ | exceeding 10% and up to 21% |
| $Na_2O$ | 0–10% |
| $Sb_2O_3$ | 0–1% |
| and a fluoride or fluorides of a metal element or elements contained in the above metal oxides, a total amount of F contained in the fluoride or fluorides | 3–10%, | being free of PbO and $As_2O_3$ except for unavoidable mixing of these compounds as impurities, having optical constants of a refractive index (nd) within the range from 1.48 to less than 1.55 and an Abbe number (vd) within the range from 45 to 55, and having an anomalous dispersion ($\Delta\theta g,F$) of +0.0010 or over.

2. An optical glass as defined in claim 1 wherein opaqueness and devitrification do not take place in the glass when the glass has been reheated and held for 30 minutes at a temperature within a temperature range which is higher than glass transition temperature (Tg) by 200° C. to 300° C.

3. An optical glass as defined in claim 1 wherein opaqueness and devitrification do not take place in the glass when the glass has been reheated and held for 30 minutes at a temperature within a temperature range which is higher than glass transition temperature (Tg) by 200° C. to 250° C.

4. An optical glass as defined in claim 1 wherein water resistance of the glass is Class 1 as measured by the Method of Measuring Chemical Durability of Optical Glass (Powder Method) as defined by the Japan Optical Glass Industry Association Standard JOGIS06-[1999].

5. An optical glass as defined in claim 1 wherein wavelength of light ray which a glass piece having thickness of 10±0.1 mm transmits with spectral transmittance of 80% including reflection loss is 390 nm or below.

6. An optical glass having a positive anomalous dispersion comprising, in mass %,

| | |
|---|---|
| $SiO_2$ | 40–60% |
| $B_2O_3$ | 3–9% |
| $TiO_2$ + $WO_3$ | 4–20% |
| in which $TiO_2$ | 3–15% |
| and $WO_3$ | 0.5–5.0% |
| $Nb_2O_5$ | 0.1–5.0% |
| $Al_2O_3$ | 3–15% |
| MgO | 0–3% |
| CaO | 0–3% |
| SrO | 0–3% |
| BaO | 0–3% |
| $K_2O$ + $Na_2O$ | less than 25% |
| in which $K_2O$ | exceeding 10% and up to 21% |
| and $Na_2O$ | 0–10% |
| $Sb_2O_3$ | 0–1% |
| and a fluoride or fluorides of a metal element or elements contained in the above metal oxides, a total amount of F contained in the fluoride or fluorides | 3–10%, | being free of PbO and $AS_2O_3$ except for unavoidable mixing of these compounds as impurities, having optical constants of a refractive index (nd) within the range from 1.48 to less than 1.55 and an Abbe number (vd) within the range from 45 to 55, and having an anomalous dispersion ($\Delta\theta g,F$) of +0.0010 or over.

7. An optical glass as defined in claim 6 wherein opaqueness and devitrification do not take place in the glass when the glass has been reheated and held for 30 minutes at a temperature within a temperature range which is higher than glass transition temperature (Tg) by 200° C. to 300° C.

8. An optical glass as defined in claim 6 wherein opaqueness and devitrification do not take place in the glass when the glass has been reheated and held for 30 minutes at a temperature within a temperature range which is higher than glass transition temperature (Tg) by 200° C. to 250° C.

9. An optical glass as defined in claim 6 wherein water resistance of the glass is Class 1 as measured by the Method of Measuring Chemical Durability of Optical Glass (Powder Method) as defined by the Japan Optical Glass Industry Association Standard JOGIS06-[1999].

10. An optical glass as defined in claim 6 wherein wavelength of light ray which a glass piece having thickness of 10±0.1 mm transmits with spectral transmittance of 80% including reflection loss is 390 nm or below.

* * * * *